United States Patent
Nakano et al.

[11] Patent Number: 6,113,207
[45] Date of Patent: Sep. 5, 2000

[54] APPARATUS FOR PROCESSING IMAGE INFORMATION

[75] Inventors: Yuji Nakano, Kawasaki; Minoru Yokoyama, Yokohama; Naohiro Iwata, Yokosuka; Hideyuki Terashima, Sagamihara, all of Japan

[73] Assignee: Canon Kabushiki Kaisha, Tokyo, Japan

[21] Appl. No.: 08/449,572

[22] Filed: May 24, 1995

[30] Foreign Application Priority Data

| May 31, 1994 | [JP] | Japan | 6-118344 |
| May 24, 1994 | [JP] | Japan | 6-109592 |
| May 15, 1995 | [JP] | Japan | 7-115498 |

[51] Int. Cl.$^7$ ...................................................... B41J 2/01
[52] U.S. Cl. .................................. 347/3; 347/37; 347/50
[58] Field of Search ...................................... 347/3, 37, 50

[56] References Cited

U.S. PATENT DOCUMENTS

| 4,893,137 | 1/1990 | Ebinuma | 347/3 X |
| 4,920,421 | 4/1990 | Stemmle | 347/3 |
| 5,204,736 | 4/1993 | Abe | 347/3 |
| 5,229,791 | 7/1993 | Kuboki | 347/3 |
| 5,731,885 | 3/1998 | Nagahara | 347/3 X |
| 5,832,190 | 11/1998 | Terajima | 347/3 X |

*Primary Examiner*—John Barlow
*Assistant Examiner*—Craig A. Hallacher
*Attorney, Agent, or Firm*—Fitzpatrick, Cella, Harper & Scinto

[57] ABSTRACT

An image processor includes a first image information processing unit which processes image information with respect to a sheet medium. A first sheet medium feeding path guides the sheet medium to the first image information processing unit, and exhausts the sheet medium from the first image information processing unit. A second image information processing unit processes image information with respect to a sheet medium while allowing a head for processing image information to travel serially. The second information processing unit is arranged on a side lower than the first image information processing unit. A second sheet medium feeding path guides the sheet medium to the second image information processing unit, and exhausts the sheet medium from the second image information processing unit. An electric circuit board is arranged below the feeding path of the first sheet medium, and above the feeding path of the second sheet medium. The electric circuit board is arrange on the reverse side of the head for processing image information. In this way, the number of boards and harnesses are reduced, thus reducing cost, and enhancing assembling capability and reliability.

22 Claims, 11 Drawing Sheets

APPARATUS FOR PROCESSING IMAGE INFORMATION

BACKGROUND OF THE INVENTION

1. Field of the Invention

The present invention relates to an apparatus for processing image information provided with a recording unit for forming ink images and other image information on a sheet medium by use of ink or a reading unit for reading image information formed on the surface of a sheet medium such as a source document. More particularly, the invention relates to the structure of an electric board used for the apparatus for processing image information.

2. Related Background Art

As an apparatus for processing image information, there has been a printer provided with a recording unit for forming ink images on a sheet medium by use of ink, a scanner provided with a reading unit for reading image information represented by ink or the like on the surface of a sheet medium such as a source document, or an apparatus provided with both of them for recording on a sheet medium the image information as it has been read by a reading unit or after having been processed by use of a recording unit.

Then, as an apparatus for processing image information, a facsimile apparatus is known.

For facsimile apparatuses, there are those which use an ordinary sheet, a thermo-sensitive sheet, or the like as a recording medium (sheet medium) for recording to be made on by use of the recording system of the apparatus. In recent years, a facsimile apparatus using an ordinary sheet begins to be used more widely in consideration of the easier preservation of sheets, shareability with other apparatuses such as copying machine, lesser degree of presenting environmental problems, among other advantages obtainable by the use of ordinary sheets. Of such facsimile apparatus, the one provided with recording systems of ink jet type attracts particular attention because of the advantages that the facsimile apparatus of this type can be fabricated compactly at lower costs.

FIG. 15 shows a conventional facsimile apparatus described above. The fundamental structure of the facsimile apparatus shown in FIG. 15 is: an operational unit 101 having various keys; a reading unit 102 which reads information while feeding a source document; a recording unit 103 for recording such information on a recording sheet; and an electric board 104 forming control systems for controlling the entire system of the apparatus and others, in that order from above.

The operational unit 101 is provided with an operating board 101c having tact switches 101a for various keys and an LCD 101b and others functioning as an indicating unit assembled on it. The reading unit 102 is provided with a sensor 102a for sensing the presence and absence of a source document, and a document edge sensor 102b for detecting the edges, such as the leading and trailing ends, of a source document, in addition to means such as rollers for feeding a source document, and means for reading information from the source document. The recording unit 103 is provided with a roller sensor 103b for detecting one rotation of a pickup roller 103a, a sheet edge sensor 103c for detecting the leading and trailing ends of a recording sheet, and a footer sensor 103d for recording a pattern on a recording sheet in order to detect its density for determining ink remains and any existence of jamming, in addition to feeding means such as rollers, and recording means (head cartridge 103e) for recording information on the recording sheet. The electric board 104 comprises a control board 104a constituting a controller for controlling the operation of the apparatus, a line net control board 104b which constitutes a line net controller for controlling the line relations, and a power source board 104c having the main power-supply.

Then, for each of the sensors 102a, 102b, 103b, 103c, and 103d, its board and harness are arranged to connect it to the control board 104a after being drawn around inside the apparatus.

Also, for the recording unit (recording apparatus) for a facsimile apparatus, copying machine, printer, or the like, each serving as an apparatus for processing image information, there is adopted a system having a recording head mounted on a carriage for performing recording by allowing it to travel serially in the direction different from the sheet feeding direction. The structures adopted for the electric circuit board of the controlling system of such recording apparatus are roughly divided into two kinds as given below.

1) A comparatively large-sized electric circuit board such as used for a large printer and facsimile apparatus, or a board which is arranged for an apparatus whose size itself is large. In a recording apparatus of this type, a part (that is, a first electric circuit board) of the electric circuit board to control the recording apparatus is arranged on the plane in the vicinity of a carriage including lines parallel to the traveling direction of the carriage, and then, this board and the main control electric circuit board (a second electric circuit board) are connected by means of bundled wires.

2) A comparatively small-sized electric circuit board such as used for a printer or arranged for an apparatus whose size itself is small. For a recording apparatus of the type, a small electric board (that is, a first electric circuit board) to control the recording apparatus is arranged in a plane in the vicinity of a carriage including lines parallel to the traveling direction of the carriage.

The first electric circuit boards of the structures referred to in the preceding paragraphs 1) and 2) are comparatively small-sized, and are formed in half a width or less than a half the width of the traveling range of the carriage. Therefore, the flexible cable which connects the recording head and the first electric circuit board can be connected to the assembling surface of the board formed on the side opposite to the carriage through the side face of the board without standing in the way if only the first electric circuit board should be arranged close to one side.

In this case, what is most important is the length of the cable and the path through which it is connected. In a apparatus having a system of serial traveling, the above-mentioned flexible cable is generally structured as follows:

At first, The flexible cable is a wiring element of a sandwiched structure, that is, the element is finely produced by depositing or adhesively bonding a conductor on a high-quality resin film of polyimide or the like, and then, it is further covered by the film.

Consequently, this cable is made characteristic in that 1) being flat, the cable can be bent uniformly in the direction at right angles to the plane (thus often used as a connecting cable to the carriage), and 2) cost per length is high (but for a comparatively short wiring, the cost becomes lower as compared with the bundled wires usually used to the extent that the connector generally required on the wire side can be omitted by this cable arrangement). Here, although the cable can be formed arbitrarily in any shape, it may easily cost more depending on the process requirements for its manufacture.

Now that the carriage scans in the main scanning direction, the flexible cable which is connected to the carriage should be clamped by means of a chassis or the like which is fixed substantially in the central portion of the traveling range of the carriage, and then, should be drawn further around to connect it to the first electric circuit board described above. This arrangement is necessary in order to make the length of the flexible cable shorter, and also, to prevent the flexible cable from being projected largely outside the traveling range of the carriage when the cable is in excess.

Also, with the structure described in the paragraph 2), the width of the board cannot be but approximately half the traveling range of the carriage if it is used for a facsimile apparatus or the like which is provided with a comparatively large-sized electric circuit board. In this case, it is inevitable that its height should be made greater in order to obtain a required area, thus necessitating to make the apparatus larger as a whole (such being the case, this is not adopted for a facsimile apparatus eventually). Also, if the first electric circuit board is made smaller in its height while expanding its width to cover the entire traveling range of the carriage, it is inevitable that the flexible cable should be drawn long to be connected to the assembling surface along the reverse side (soldering end) of the first electric circuit board. As a result, this arrangement tends to allow the system to be easily affected by noises, and also, results in a higher cost of manufacture.

Also, in the conventional example described above, many numbers of boards (operating board, control board, net control board, board for each of the sensors, and the like) are present, while these boards should be connected by wires. Many numbers of harnesses are to be drawn in the interior of the apparatus main body, hence leading to the disadvantages such as lowered assembling capability, increased costs, degraded quality, and confined structural conditions.

Also, in the conventional example described above, the boards should be connected to one another with the passage planes of a source document and a recording sheet, which are sandwiched by the boards from above and below; thus making it necessary for the harnesses to avoid standing in the way of the passage planes of the document and sheet. Also, the harnesses thus connected tend to serve as antenna to generate a considerable amount of emitting noises. Hence there is a fear that a radio or television receiver nearby is affected by such noises.

Also, in the structures 1) and 2) of the conventional recording apparatus described above, the following problems are encountered:

At first, in the structure described in the paragraph 1), the bundled wires are used to connect the first electric circuit board, which is arranged in the vicinity of the carriage, with the second electric board long way from the first board. Therefore, it is easier to pickup noises. At the same time, there are often needed various kinds of sensors to be arranged on the sheet feeding path, such as a sensor for detecting the sheet presence and absence, a sheet edge sensor. In this case, it should be desirable to assemble these sensors on the first electric circuit board to be arranged in the vicinity of the carriage in consideration of the space efficiency, assembling capability, and cost performance. In the conventional apparatus, therefore, the number of bundled wires which connect the first and second electric circuit boards is also increased accordingly, thus making it easier to pickup noises.

Also, in order to meet the requirements with respect to the maintenance of recording head, and replacement of disposable heads, the structure of the recording apparatus should desirably be arranged as a whole to provide the carriage on the upper face side (or in the direction toward the front face) of the apparatus, and the sheet feeding path and sheet feeding means on the lower face side (or in the direction toward the rear face) of the apparatus, respectively. In this case, the second electric circuit board which is arranged away from the carriage should desirably be arranged further below the sheet feeding path and sheet feeding means. This is because the second electric circuit board described above not only hinders the execution of the recording head maintenance and replacement of disposable heads, but also makes it difficult to structure the operational panel of the apparatus, among other drawbacks. In this case, the sheet feeding path is present between the first electric circuit board arranged in the vicinity of the carriage and the second electric circuit board.

In other words, the bundled wires which connect the first and second electric circuit boards should detour the sheet feeding path to a considerable extent. This unfavorably brings about a further mixture of noises. Also, the longer the bundled wires, the more the costs are increased. Also, on the subject of costs, the first electric circuit board arranged in the vicinity of the carriage is as if to function as a relaying board in this respect, which fundamentally constitutes an excessive part, a factor which results in an increase in costs.

Also, from the viewpoint of costs, even if a flexible cable is drawn around to make a direct connection with the second electric circuit board without using such relaying board, the cable should be made longer or there should be a need for the provision of a cable of different type. This will also ensure in an increased cost.

Also, it becomes impossible to sufficiently utilize the vicinity of the large area which should be used for the carriage traveling, thus necessitating the provision of a space separately for a large electric circuit board. This definitely lowers the space efficiency.

Also, in a case of the apparatus for processing image information which is provided with a recording unit (recording apparatus) of ink jet type, it is necessary for the electric board 104 to be shielded by use of an ink absorbing sheet or the like as a preventive measure against any ink leakage if the electric board 104 (control board 104*a*, net control board 104*b*, and power-supply board 104*c*) is to be arranged below the ink discharge ports 103*f* of the recording head 103*e* in the recording unit 103 as in the conventional example, because ink is conductive as well known. However, since many numbers of harnesses are drawn around for connection of the electric board 104 as described earlier, the provision of such shielding means requires an extremely complicated work. Also, there is a need for providing holes for the harnesses to pass through, thus making perfect shielding impossible, among other problems.

SUMMARY OF THE INVENTION

It is an object of the present invention to provide an apparatus for processing image information having the electric board the structure of which makes a space saving and cost reduction possible.

It is another object of the invention to provide an apparatus for processing image information having the electric board the structure of which is arranged to prevent the influence of electric noises from being exerted on its surroundings or to prevent the boards from being affected by electric noises.

It is still another object of the invention to provide the apparatus for processing image information which is not easily affected adversely by the adhesion of ink from its recording unit of ink jet type.

It is a further object of the invention to provide an apparatus for processing image information including a first image information processing unit for processing image information with respect to a sheet medium; a first sheet medium feeding path for guiding the sheet medium to the first image information processing unit, and also, exhausting the sheet medium from the first image information processing unit; a second image information processing unit for processing image information with respect to a sheet medium while allowing a head for processing image information to travel serially, this second information processing unit being arranged on the side lower than the first image information processing unit; a second sheet medium feeding path for guiding the sheet medium to the second image information processing unit, and also, exhausting the sheet medium from the second image information processing unit; and an electric circuit board arranged below the first sheet medium feeding path, but above the second sheet medium feeding path, this electric circuit board being arranged on the reverse side of the head for processing image information.

It is still a further object of the invention to provide an apparatus for processing image information including a carriage which holds a head for processing image information for processing image information with respect to a sheet medium, this carriage being allowed to travel serially in the direction different from the sheet medium feeding direction; an electric circuit board arranged in the region facing the region in which the carriage travels serially, this electric circuit board being provided with a connecting unit for connecting a conduction member in a position facing the central portion of the region for the carriage to travel serially, and in the central portion of the electric circuit board in the serially traveling direction of the carriage, for obtaining an electrical conduction with the head for processing image information held on the carriage.

It is another object of the invention to provide an apparatus for processing image information including a first image information processing unit for processing image information with respect to a sheet medium; a first sheet medium feeding path for guiding the sheet medium to the first image information processing unit, and also, exhausting the sheet medium from the first image information processing unit; a second image information processing unit for processing image information with respect to a sheet medium while allowing a head for processing image information to travel serially, this second information processing unit being arranged on the side lower than the first image information processing unit; a second sheet medium feeding path for guiding the sheet medium to the second image information processing unit, and also, exhausting the sheet medium from the second image information processing unit; and an electric circuit board arranged below the first sheet medium feeding path, but above the second sheet medium feeding path, this electric circuit board being arranged on the reverse side of the head for processing image information, and also, provided with a connecting unit for connecting a conduction member in a position facing the central portion of the region for the head for processing image information to travel serially, and in the central portion of the electric circuit board in the serially traveling direction of the head for processing image information, for obtaining an electrical conduction with the head for processing image information.

It is still another object of the invention to provide an apparatus for processing image information provided with a control system having a control board constituting a control circuit for controlling the operation of the apparatus, and a net control board constituting a net control circuit for controlling the circuital aspect of the apparatus; a reading system for transferring to the control system the information read out by feeding a source document; and a recording system positioned below the reading system in order to record on a recording medium the information transferred from the control system, wherein the control system is arranged below the passage plane of the source document in the reading system for the source document, and above the passage plane of the recording medium in the recording system.

It is another object of the invention to provide an apparatus for processing image information comprising reading means for reading a source document; recording means for recording images on a sheet in accordance with the image information read out by the reading means; a feeding element having recording means mounted thereon for scanning in the main scanning direction; an electric circuit board connected to the feeding element by a flexible cable for controlling the entire systems of the apparatus including recording means, the electric circuit board being arranged in a plane including lines substantially parallel to the scanning direction of the feeding element, and provided with a width substantially equal to the range for the feeding element to travel, wherein the assembling surface of the electric circuit board is made a face opposite to the feeding element, and the flexible cable is allowed to pass a hole arranged substantially in the central portion of the traveling range of the feeding element for connecting the feeding element and the electric circuit board.

It is still another object of the invention to provide an apparatus for processing image information comprising reading means for reading a source document; recording means for recording images on a sheet in accordance with the image information read out by the reading means; a feeding element having recording means mounted thereon for scanning in the main scanning direction; an electric circuit board connected to the feeding element by a flexible cable for controlling the entire systems of the apparatus including recording means, the electric circuit board being arranged in a plane including lines substantially parallel to the scanning direction of the feeding element, and provided with a width substantially equal to the range for the feeding element to travel, wherein the assembling surface of the electric circuit board is made a face opposite to the feeding element, and the electric circuit board is provided with a plurality of boards connected by wires with each other, one of the boundaries of which is positioned substantially in the central portion of the traveling range of the feeding element, and the flexible cable is allowed to pass the space created in this boundary for connecting the feeding element and the assembling surface of the electric circuit board.

BRIEF DESCRIPTION OF THE DRAWINGS

The above-mentioned and other objects, features and advantages of the present invention will become more apparent by reference to the following detailed description of the invention taken in conjunction with the accompanying drawings, wherein.

DETAILED DESCRIPTION OF THE PREFERRED EMBODIMENTS

Hereinafter, with reference to the accompanying drawings, the specific description will be made of a facsimile apparatus as one embodiment, to which an apparatus for processing image information of the present invention is applicable. In this respect, the present embodiment will be described by exemplifying a facsimile apparatus which is provided with a serial type ink jet recording apparatus.
(Entire Structure)

As shown in FIG. 1 to FIG. 6, a facsimile apparatus of the present embodiment comprises a reading system A for reading information by feeding a source document G to transfer it to the control system C which will be described later; a recording system B, which is positioned below the reading system A, for recording on a recording sheet S the information transferred from the control system C which will be described later; a control system C having a control board constituting a control circuit for controlling the operation of the apparatus, and a net control board constituting a net control circuit for controlling circuitry; and a operational system D having an operating board on which various key switches and an indicating unit are assembled.

In the present facsimile apparatus, the control system C is arranged below the passage plane of the source document in the reading system A, and above the passage plane of the sheet in the recording system B. Also, since the recording system B is a recording system of a serial type, it is larger than the width of the reading system A by approximately several tens of mm when observed from the front side of the apparatus main body. Therefore, the left side of the reading system A is shifted to agree with the left end portion of the recording system B. Then it is made possible to arrange the driving mechanism for the reading system A and the operational system D, which will be described later, in a space on the right side of the reading system A.

Now, with reference to the accompanying drawings, the structure of each unit will be described in detail.
(Reading System)

Figure 1:
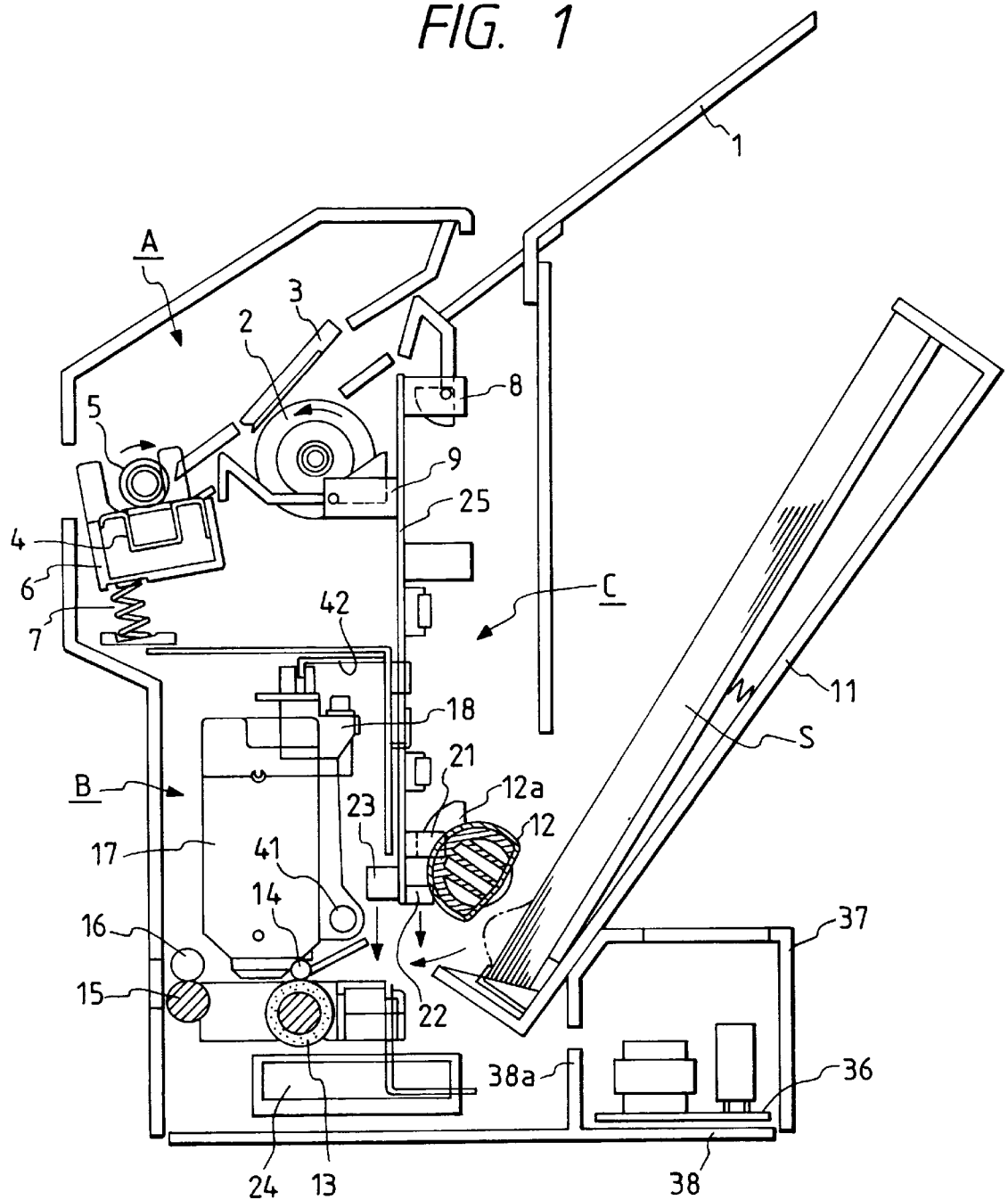
FIG. 1 is a cross-sectional view (taken along line 1—1 in FIG. 6) which schematically shows a facsimile apparatus as one embodiment of an apparatus for processing image information in accordance with the present invention.

As shown in FIG. 1, the reading system A comprises a separation roller 2 for separating and feeding one by one the source documents G set on a source document stacker 1; a frictional piece 3 which is in contact with the separation roller 2 under pressure; a contact type image sensor 4 having an LED source, a photoelectric element, and a custom IC for processing its output, which transforms the information (image data) of the source document into electric output; a CS roller 5 functioning to press the source document G, feed it, and present the white standard; a CS holder 6 which holds the contact type image sensor 4; and a bias spring 7 to cause the contact type image sensor 4 to be biased to the CS roller 5. Also, in FIG. 1, a reference numeral 8 designates a sensor for detecting the presence and absence of a sour ce document to determine whether or not any source document G is present; and 9, a source document edge sensor for detecting the leading end and trailing end of the source document G.

Figure 2:
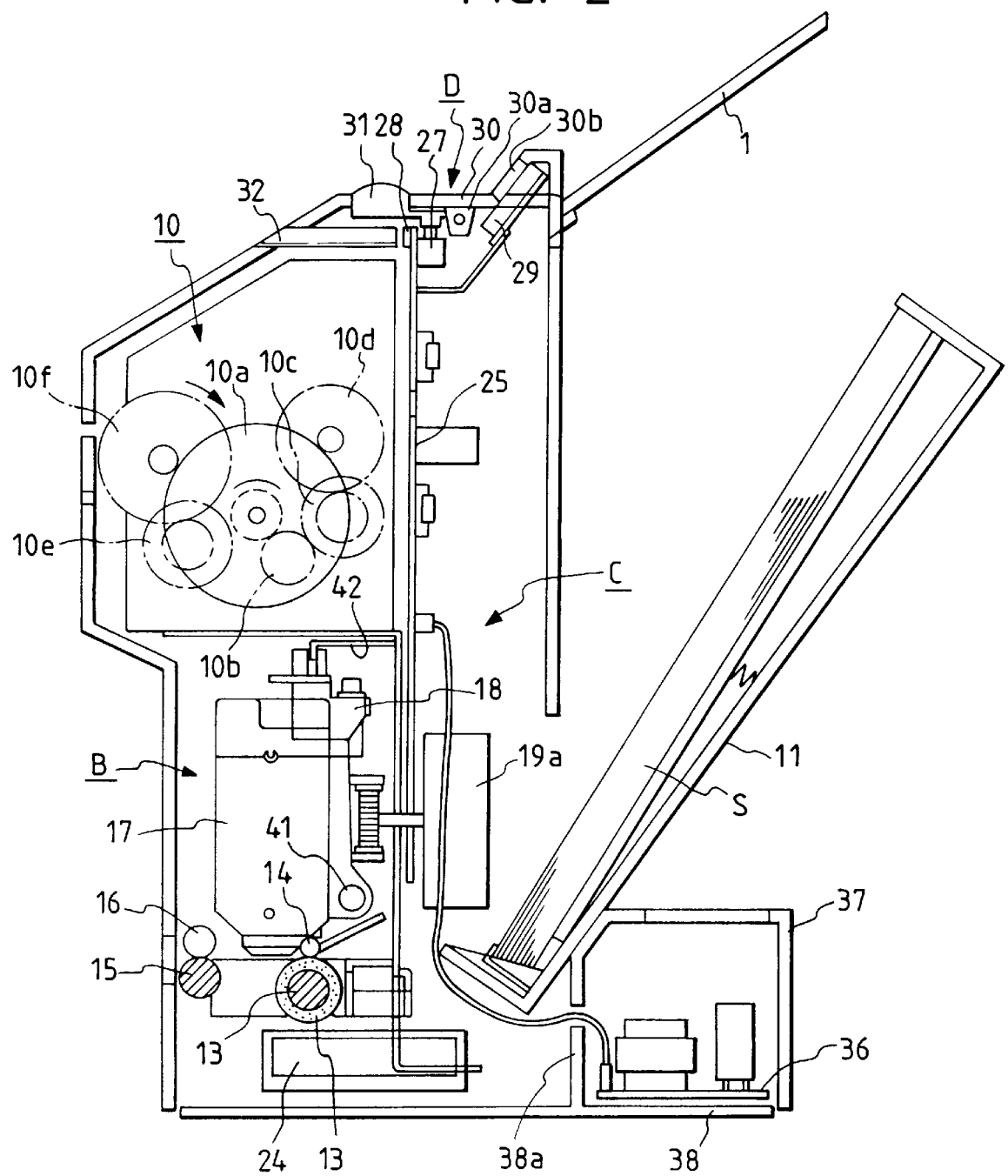
FIG. 2 is a cross-sectional view (taken along line 2—2 in FIG. 6) which schematically shows a facsimile apparatus in accordance with the present embodiment.
Figure 3:
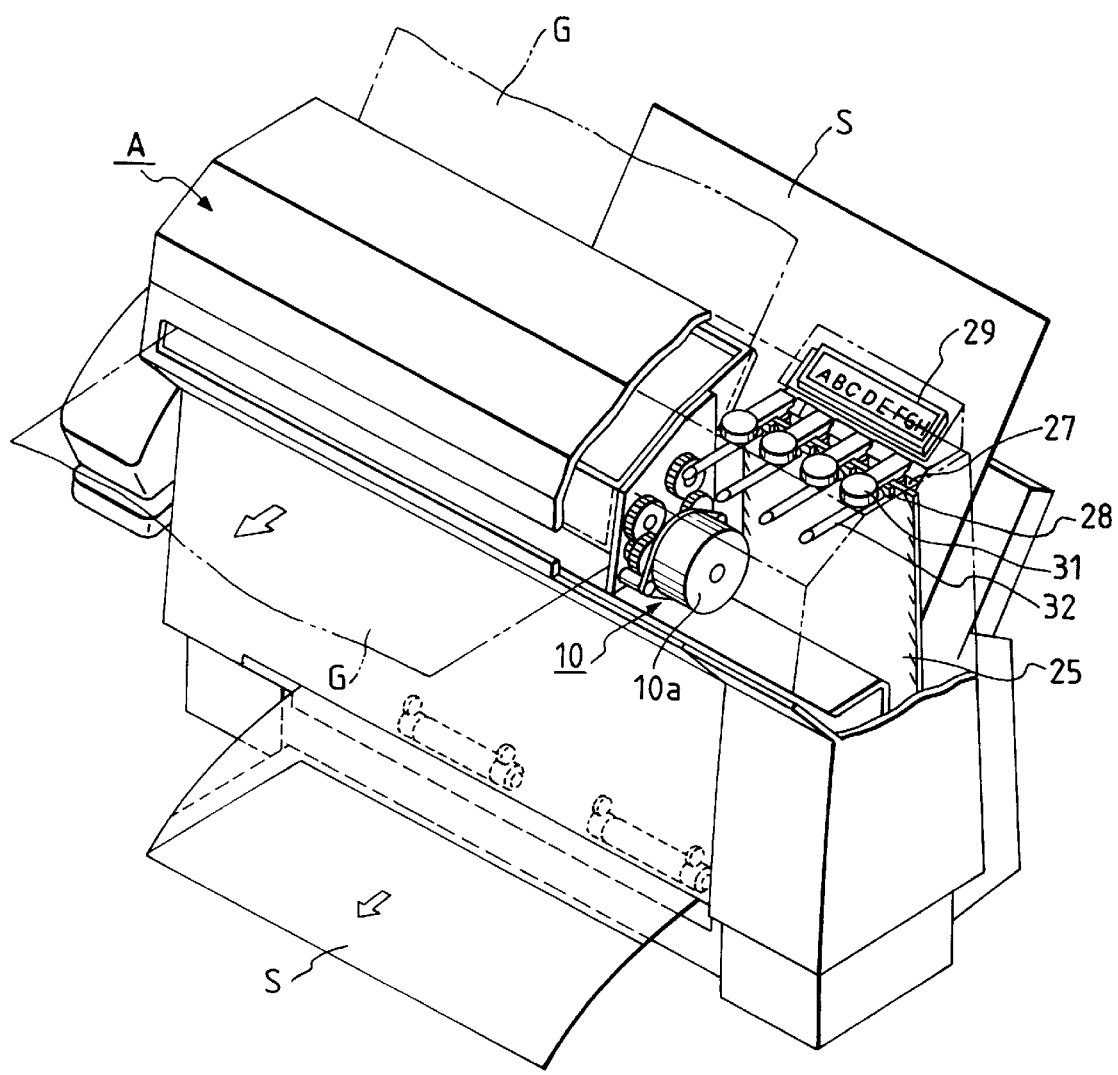
FIG. 3 is a perspective view which schematically shows a facsimile apparatus in accordance with the present embodiment by partially cutting off its cover.

Also, the driving mechanism 10 for driving and rotating the separation roller 2 and CS roller 5 to feed the source document G is arranged on the height-hand side of the reading system A when observed from the front side of the apparatus main body as shown in FIG. 2 and FIG. 3. This driving mechanism 10 comprises a reading motor 10a, a driving source, gears 10b, 10c, and 10d to transmit the driving force of the motor ana to the separation roller 2, and g ears 50e and 10f to transmit the driving force of the motor loa to the CS roller 5.

In the reading system A structured as described above, when the user sets a stack of source documents on th e source document stacker 1, the sensor 8 for detecting the presence a nd absence of the source document is turned on. Then, when the starting switch of the operational system D, which will be described later, is depressed, the driving mechanism 10 structured as described above is driven to rotate the separation roller 2, thus beginning to feed a source document G. At this juncture, depending on the degrees of friction between the frictional piece 3, source document G, and separation roller 2, the source documents G are separated and fed one by one. The leading end of the source document thus separated and fed is detected by the source document edge sensor 9. The source document G is further fed by the separation roller 2, and then, the information (image data) of the source document G is read by the contact type image sensor 4 while the document is pinched by the CS roller 5 and the contact type image sensor 4 for still more feeding. The information thus read are transferred to the control system C which will be described later.
(Recording System)

As shown in FIG. 1, the recording system B comprises a pickup roller 12 which picks up and feeds one by one the recording sheets S stacked on a sheet holder 11; a feed roller 13 which feeds the recording sheet S thus picked up and fed in; a pressure roller 14 which is in contact with the roller 13 and rotates following the rotation thereof; an exhaust roller 15 which feeds out the recorded sheet S; a spur 16 which is in contact with the roller 15 and rotates following the rotation thereof; a head cartridge 17 integrally formed by a recording head for recording ink images on the recording sheet S and an ink tank which retains ink to be supplied to the head; and a carriage 18 having the head cartridge 17 detachably mounted on it and reciprocates in the direction rectangular to the sheet feeding direction.

Figure 5:
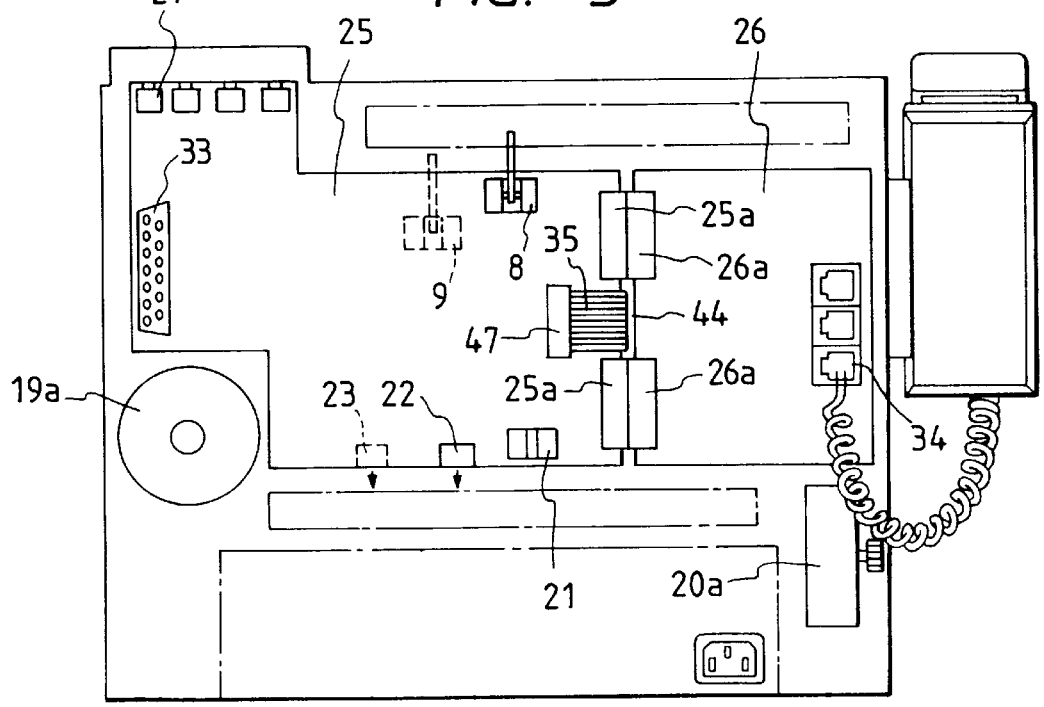
FIG. 5 is a rear view which schematically shows a facsimile apparatus in accordance with the present embodiment by removing its rear cover.
Figure 6:
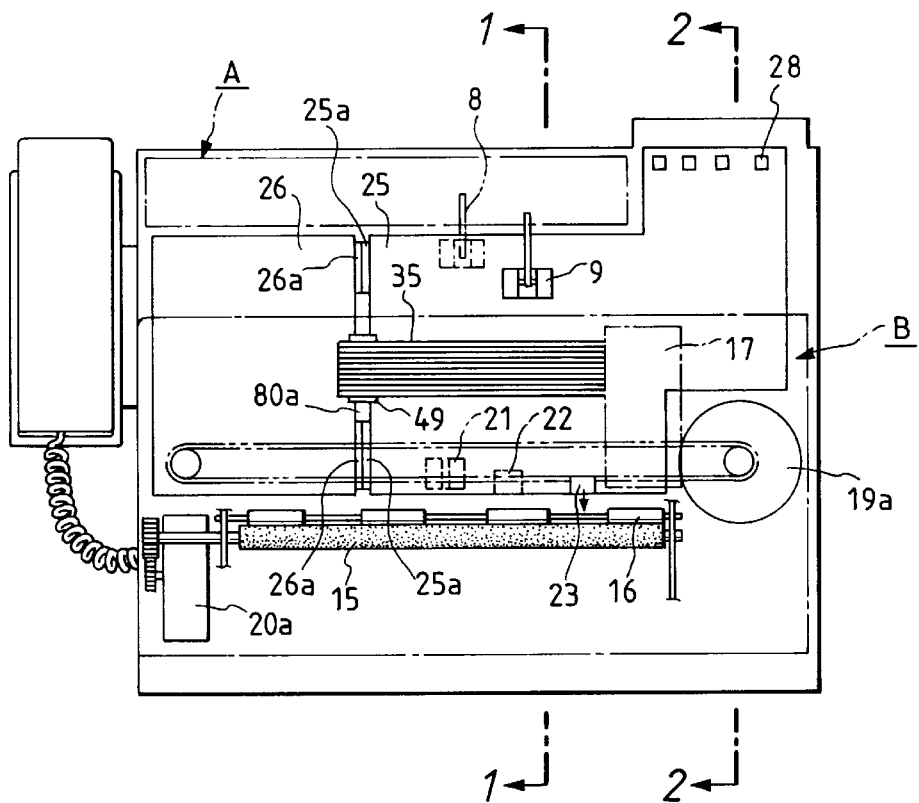
FIG. 6 is a front view which schematically shows a facsimile apparatus in accordance with the present embodiment by removing its front cover.

In this respect, the carriage 18 which holds the head cartridge 17 can reciprocate in such a way that as shown in FIG. 1, FIG. 2 and FIG. 6, the driving force of a carriage motor 19*a*, a driving source, is transmitted to the carriage through the power transmission system comprising a timing belt, pulleys, and others, while the carriage is being guided by a guide shaft 41B and guide rail 42. Also, the feed roller 13 and exhaust roller 15 which are driven to rotate for feeding the recording sheet S can rotate in the sheet feeding direction in such a way that as shown in FIG. 5, the driving force of a recording motor 20*a*, a driving source, is transmitted to the rollers through the power transmission system comprising gears and others (not shown).

Also, as a recording method applicable to the recording system B, an ink jet recording method is adopted for recording by discharging ink from the recording head. In other words, this recording head is provided with fine liquid discharge ports (orifices), liquid paths, energy activation units disposed on a part of each liquid path, and energy generating means for generating the energy to form droplets which acts upon the liquid in the energy activation units.

As an energy generating means for generating such energy, there is, among others, a recording method using electromechanical transducing elements such as piezoelectric elements, a recording method using an energy generating means which discharges droplets by the action of heat generation caused by irradiation of electromagnetic wave such as laser, or a recording method using an energy generating means for discharging liquid by heating it by use of electrothermal transducing elements such as heat generating elements having heat generating resistors.

Of these methods, a recording head used for an ink jet recording method, which discharges liquid by the application of thermal energy, makes it possible to record images in a high resolution because the liquid discharge ports (orifices) can be arranged in a high density for the formation of droplets to be discharged for recording. Of such methods, a recording head using electrothermal transducing elements as its energy generating means can be fabricated easily and compactly. Also, for the fabrication thereof, it is possible to sufficiently utilize the advantages of the IC technologies and micro-machining techniques whose technical advancement and reliability have been significantly enhanced in the field of semiconductors in recent years. This method is favorable in consideration of the ease with which it can be assembled in a high density at low manufacturing costs.

Also, in FIG. 1, a reference numeral 21 designates a roller sensor which detects the positions of the pickup roller 12 by detecting the extrusion 12*a* which is interlocked with the pickup roller 12; 22, a sheet edge sensor which detects the leading end and trailing end of the recording sheet S; 23, a footer sensor which records a pattern on the recording sheet S and senses its density to determine ink remains and presence of any jamming; and, further, 24, a waste ink tank to receive the exhausted ink and other particles clogging the head unit of the head cartridge 17.

In the recording system B structured as described above, the uppermost sheet of the recording sheets S stacked on the sheet holder 11 is at first picked up by the pickup roller 12 and fed into the nipping section formed by the feed roller 13 and pressure roller 14. At this juncture, the sheet edge sensor 22 detects the leading end of the sheet. The recording motor 20*a* is driven to rotate the feed roller 13 to bite in the sheet. After the feed roller 13 rotates in a given amount so that the sheet is fed to a specific position, the carriage motor 19*a* is driven to cause the carriage 18, having the head cartridge 17 mounted on it, to scan in the sheet width direction, and at the same time, the information read by the reading system A or the information transmitted from other apparatus is transferred to the head cartridge 17 through the control system C which will be described later. Thus a given recording is made on the sheet. The recorded sheet is driven by the recording motor 20*a* and exhausted externally by the cooperation of the exhaust roller 15 and the spur 16.

(Control System)

As shown in FIG. 5 and FIG. 6, the control system C comprises a control board 25 constituting a control circuit for controlling the operation of the apparatus, and a line net control board 26 constituting a line net control circuit for controlling line relations. The control board 25 and net control board 26 are placed uprightly on the back side of the scanning section of the carriage 18 having the head cartridge 17 detachably mounted on it, below the passage plane of the source document in the reading system A but above the passage plane of the recording sheet in the recording system B as shown in FIG. 1 and FIG. 2. The control board 25 and net control board 26 are formed integrally to arrange its cross-sections substantially on the same plane (see FIG. 1 and FIG. 5). Also, as shown in FIG. 6, the control board 25 is located on the right side while the net control board 26 on the left side, and in parallel to each other when observed from the front side of the apparatus main body.

(Control board)

On the control board 25, each of sensors needed for this facsimile apparatus is assembled. In accordance with the present embodiment, those assembled sensors are: a sensor 8 for detecting the presence and absence of source document; a document edge sensor 9; a roller sensor 21; a sheet edge sensor 22; and a footer sensor 23. With the provision of these sensors, there is no need at all for the harnesses connecting the boards for use of sensors, and such sensor boards and the control board. Also, the board being placed above the plane for the sheet to pass, it is possible to prevent any malfunction that may be caused by short circuit or the like due to the adhesion of ink from the head cartridge 17 to the control board 25.

Figure 7:
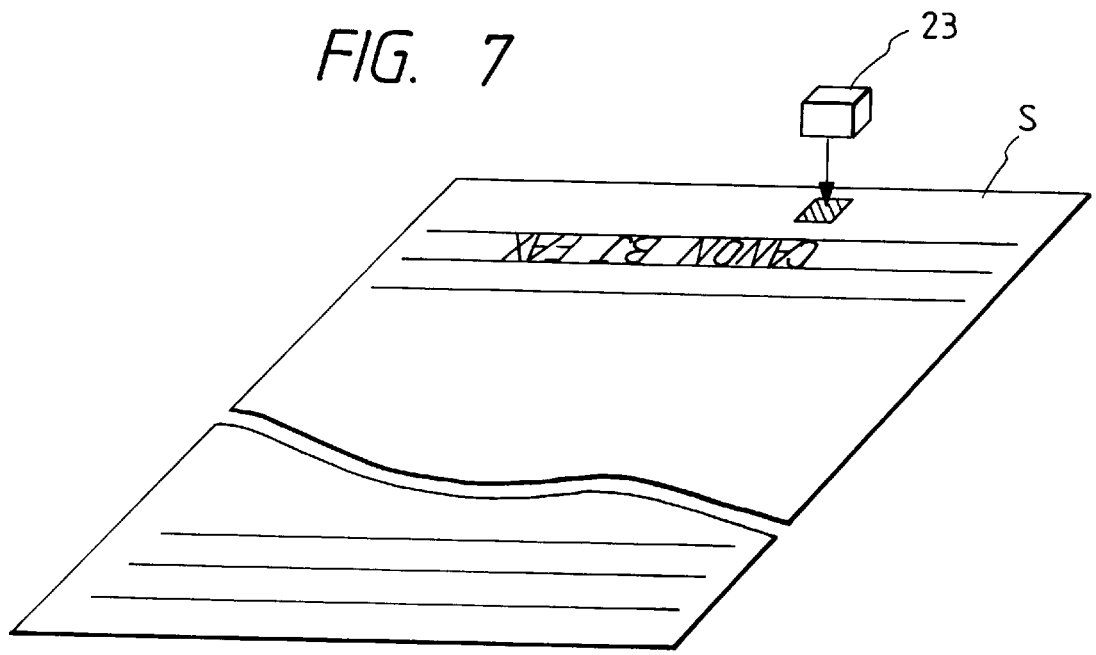
FIG. 7 is a perspective view which schematically shows the relationship between recording data, footer marks, and a footer sensor.
Figure 8:
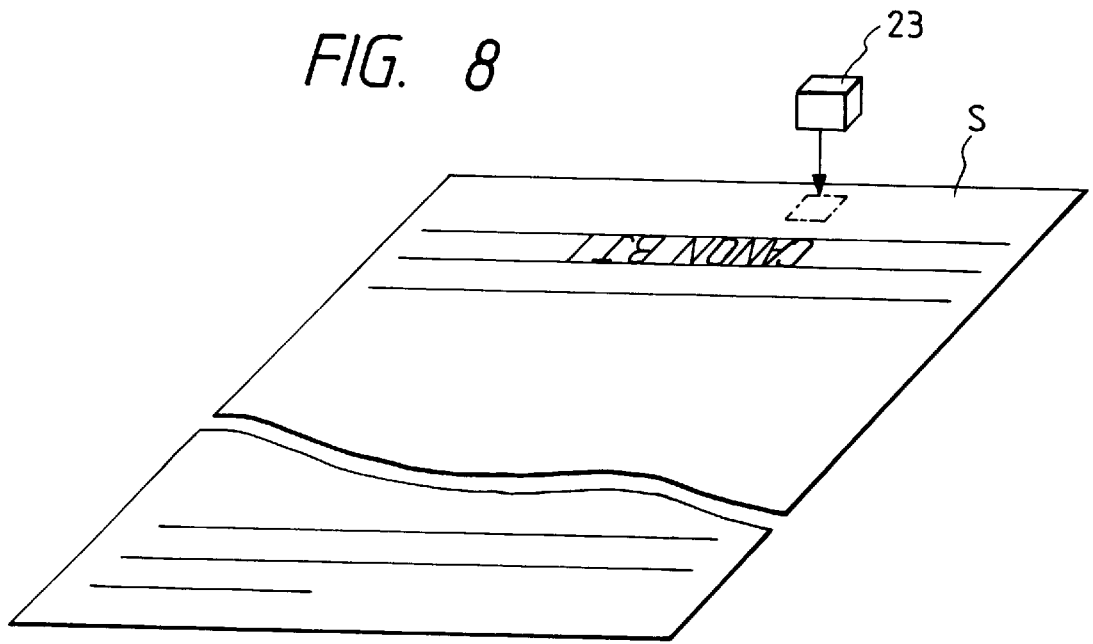
FIG. 8 is a perspective view which schematically shows the relationship between recording data, footer marks, and a footer sensor.

Now, with reference to the accompanying drawings, the footer sensor 23 will be described. Since the facsimile apparatus is provided with an automated receiving function, it is necessary for the apparatus to automatically sense the absence of ink unlike a printer or the like. As one of techniques for performing such detection, the provision of a footer sensor has been proposed. Now, this technique will be described. As shown in FIG. 7, after the completion of a recording on a recording sheet S, a patten provided at a given position on the margin of the sheet is recorded. Here, it is assumed that a rectangle of 5×5 is recorded as a given pattern mentioned above. The density of the recorded pattern is detected by a footer sensor 23 which is a sensor of a reflection type to determine the presence or absence of ink in accordance with the value of its output. In other words, if ink is present, the output value of the footer sensor 23 becomes low because the aforesaid pattern is recorded. On the other hand, if ink is exhausted on the way as shown in FIG. 8, the output value of the footer sensor 23 becomes high because the pattern is not recorded. The difference between these values is detected, and if the detected output value is found higher than a given value, it is determined that the ink is absent. Then an error message is represented in the indicating unit of the operational system D which will be described later.

Figure 15:
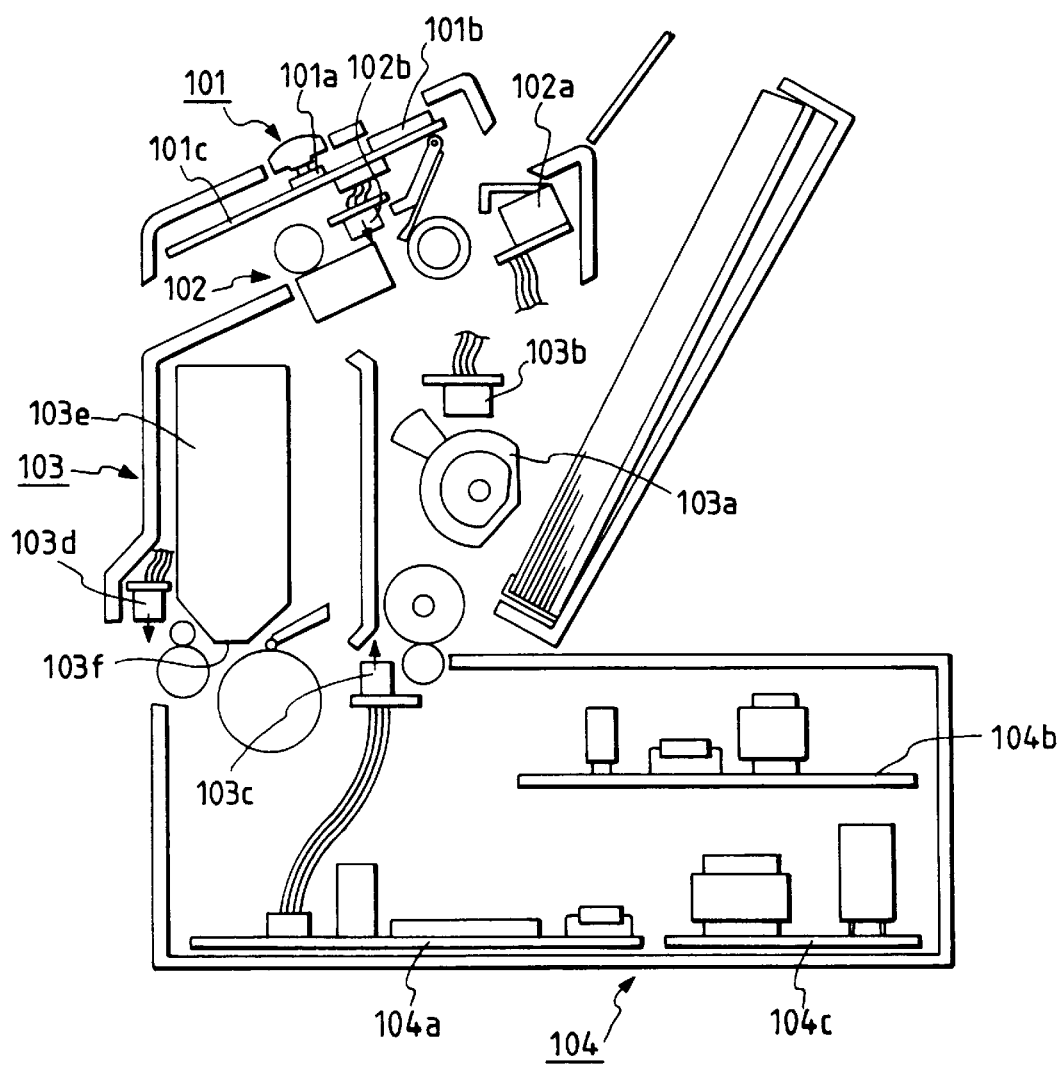
FIG. 15 is a view illustrating the prior art.

In the prior art shown in FIG. 15, the footer sensor is arranged near a pair of exhaust rollers on the downstream side of the recording position in the sheet feeding direction. When the sensor is located in the vicinity of the exhaust roller pair, it is easily affected by external light. In other words, despite ink still remains, the output value of the footer sensor becomes higher due to the influence of the external light, leading to an erroneous indication meaning that ink has been exhausted. Also, the harness connecting the footer sensor and the control board should be drawn with case so as not to allow it to stand in the scanning area of the head cartridge and the passage plane of the sheet, thus creating a problem, among others, that the assembling capability becomes extremely poor.

With these in view, therefore, the facsimile apparatus embodying the present invention is arranged so that the footer sensor 23 is assembled on the control board 25 and located in the vicinity of the feed roller 13 on the upstream side in the sheet feeding direction. Further, as shown in FIG. 6, the footer sensor 23 is equally divided in the sheet width direction to be disposed in parallel, and arranged between the pressure rollers 14, which are in contact with the feed roller 13, in the region having the smallest width for the sheet to pass.

Also, as shown in FIG. 6, the upper right side of the control board 25 extends to the right side of the reading system A when observed from the front side of the apparatus main body. On this extended portion of the control board 25, the operating circuit of the operational system D is formed, and as shown in FIG. 2 and FIG. 3, the tact switch 27, LED 28, LCD 29, and others are assembled thereon. The tact switch 27 is depressed when the operator depresses an operational key 31 rotatively supported on the rib 30a of the external cover 30. Also, when the LED 28 is illuminated, its light is guided externally by means of the light guide 32 which is provided for the external cover 30 so that it can be recognized by the user visually. Also, the contents represented on the LCD 29 can be recognized visually through the transparent portion 30b of the external cover 30. Therefore, it becomes unnecessary to provide any operational board for the operational system separately as in the prior art. There is no need at all for arranging the harness to connect such operational board and the control board. In this respect, it is clear from FIG. 3 that the extended portion of the control board 25 which constitutes the operational circuit of the operational system D is positioned above the passage plane of the source document in the reading system A in accordance with the present embodiment, but it may be possible to arrange a structure so as not to particularly extend the operational system alone by devising the configuration of the operational key or the like.

Figure 4:
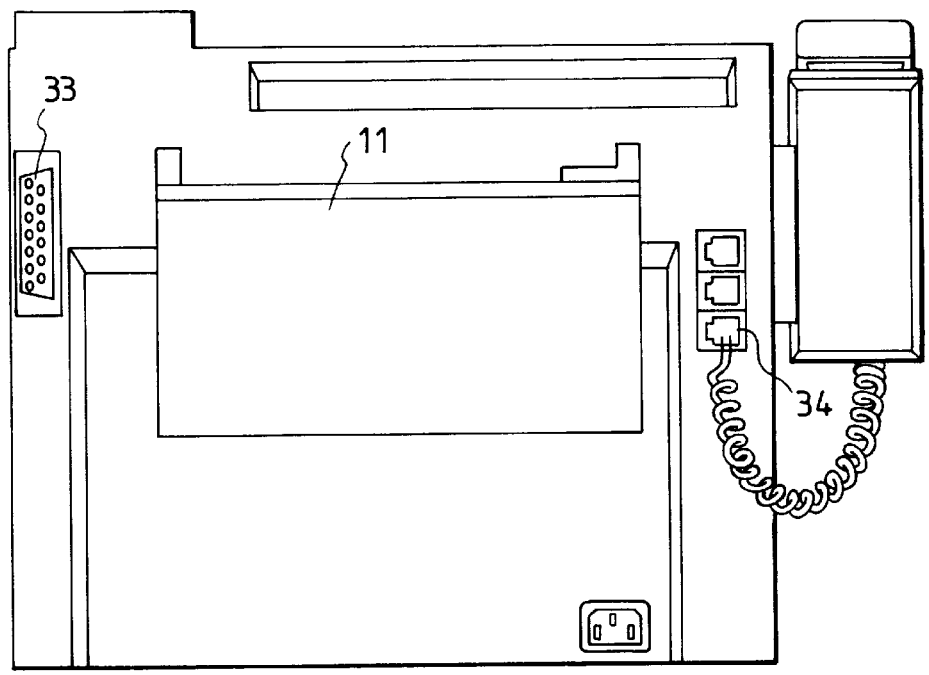
FIG. 4 is a rear view which schematically shows a facsimile apparatus in accordance with the present embodiment.

Also, this facsimile apparatus is provided with an interface to enable it to function as a printer by connecting it to a computer. In this facsimile apparatus, the interface 33 is assembled on the control board 25 as shown in FIG. 4 and FIG. 5 with the purport that the numbers of boards and harnesses are made as small as possible. Here, the structure is arranged so that the position of the interface 33 thus provided is set on the left side (control board side) out of the sheet passage region when observed from the back side of the apparatus main body, because there is a possibility that the connecting cable between the interface and the computer hinders the feeding of the recording sheet if it is positioned on the sheet passage plane or above the plane of sheet passage.

(Line net control board)

Also, this facsimile apparatus is provided with a modular jack 34 for connecting the hand sets for the external circuit, the secondary telephone, and the apparatus main body. In this facsimile apparatus, the modular jack 34 is assembled on the line net control board 26 as shown in FIG. 4 and FIG. 5 with the purport that the numbers of boards and harnesses are made as small as possible. Usually, the handset or the like is arranged on the left side when observed from the front side of the apparatus main body for the convenience of actual use. Therefore, the arrangement is made so that the modular jack 34 is positioned on the right side (line net control board side) when observed from the back side of the apparatus main body.

Also, the modular jack is positioned above the sheet passage plane. Therefore, it is possible to prevent any drawback that may cause trouble such as short circuit or the like due to the adhesion of ink from the head cartridge 17 to the net control board 26.

Also, the control board 25 and the net control board 26 are connected by coupling the connectors 25a and 26a as shown in FIG. 5 and FIG. 6 in order to reduce the number of harnesses to connect the boards. In this way, the control board 25 and the net control board 26 are integrated as shown in FIG. 1 and FIG. 2 so that its cross-sections are substantially on the same surface.

Also, between the control board 25 and the net control board 26, the flexible cable 35 from the carriage 18 is arranged to pass through for connection to the control board 25. Here, as described earlier, the reading system A is shifted to the left side for arrangement when observed from the front side of the apparatus main body. The net control board 26 is positioned below the source document passage plane accordingly.

In this respect, it may be possible to arrange a structure so that the control board 25 and the net control board 26 are divided, and then, integrated by coupling the connectors themselves for providing the same surface at its cross-sections. It is not necessarily limited to this structure, either. It may be possible to form the boards 25 and 26 with one electric circuit board 40, for example. In this case, a hole should be provided for the board to allow the flexible cable 35 of the carriage 18 to pass it.

Figure 9:
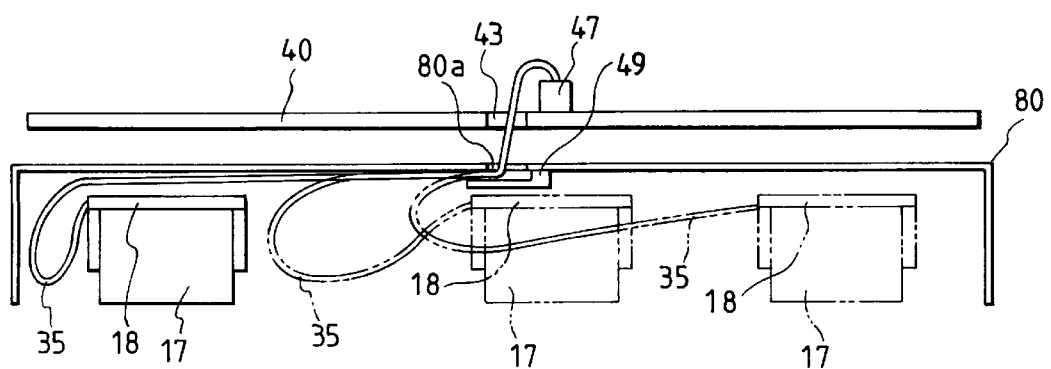
FIG. 9 is a sectionally perspective view which schematically shows an electric circuit board of a facsimile apparatus in accordance with the present embodiment.
Figure 10:
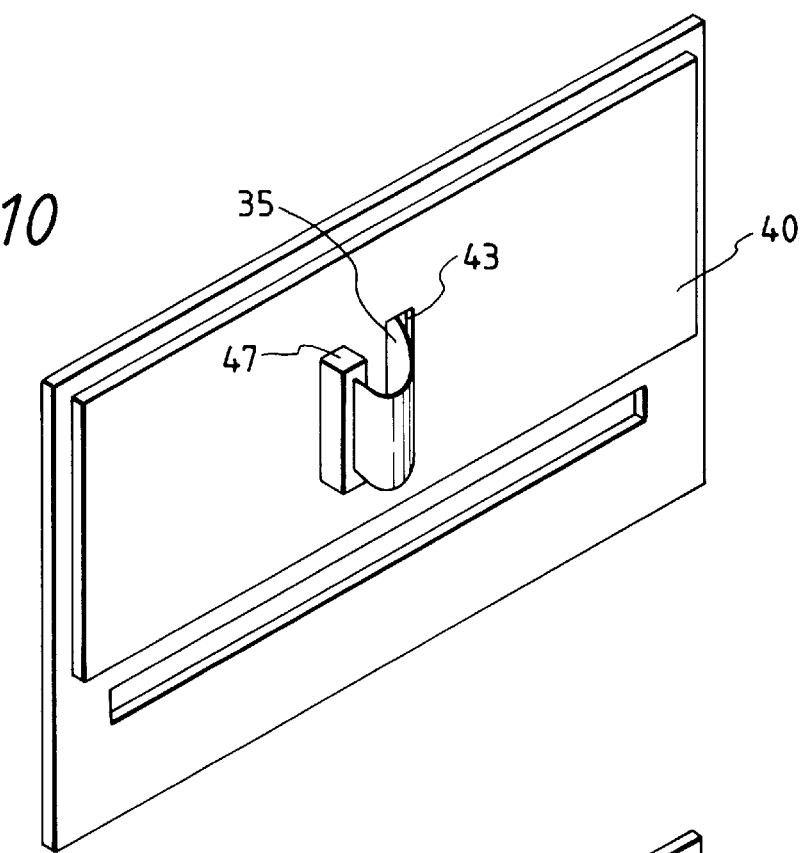
FIG. 10 is a perspective view which schematically shows an electric circuit board of a facsimile apparatus in accordance with the present embodiment.

Now, with reference to FIG. 9 and FIG. 10, the description will be made of the structure of an electric circuit board 40 for the facsimile apparatus described above. The recording head cartridge 17 is held by the carriage 18. The carriage 18 reciprocates in the right and left directions in FIG. 9 by driving means which is not shown, while being guided by means of the guide shaft 41 and guide rail 42. In this respect, it may be possible to use a scanner of such a mode that a reading head (scanner head) is held by the carriage 18 in place of the recording head cartridge 17. Here, a reference numeral 47 designates a connector assembled directly on the electric circuit board 40. To this connector 47, one end of the flexible cable 35 is connected. The other end of the flexible cable 35 is connected to the carriage 18, and then, coupled electrically to the recording head cartridge 17 through the carriage 18. The flexible cable 35, which is connected to the connector 47 on the assembling surface of the electric circuit board 40, is guided to the reverse side of the assembling surface (see FIG. 10) through a cable hole 43 provided for the electric circuit board 40 substantially in the central portion of the traveling region of the carriage 18. Then, when the cable is passed through a hole 80a formed on the frame 80 in the central portion in the left and right directions in FIG. 9, it is once clamped by a cable pressure 49 arranged on the frame 80. In this way, the cable is connected to the carriage 18. Also, as shown in FIG. 9, the carriage 18 reciprocating in the left and right directions, the flexible cable 35 follows it while being bent accordingly. However, as the flexible cable 35 is clamped by the cable pressure 49 on the flame 80 in the central portion in the left and right directions, there is no possibility that the flexible cable 35 hinders the traveling of the carriage 18.

With the structure described above, whereas the electric circuit board 40 is arranged in a size as large as the area equivalent to the traveling range of the carriage 18, it is possible to make the flexible cable 35 short. As a result, the influence of noises can be reduced. Also, as a large area is made available for the electric circuit board 40, it is possible to collectively arrange on the electric circuit board 40 an extremely large electric circuitry (comprising a main control circuit, modem, line net controller, telephone line, reading control circuit, and recording control circuit (including a printer circuit for personal computer), among others). In this way, it can dispense with any excessive boards and bundled wires any longer, making it possible to provide a small-sized facsimile apparatus at lower costs.

Also, the electric circuit board 40 described above is not located below the recording head cartridge 17. Therefore, there is no possibility that any short circuit or ignition occurs due to ink leakage. It is also possible to omit such a member as a pan or a seal.

Also, it becomes possible to make the bundled wires short by arranging sensors in the vicinity of the recording head cartridge 18 or to assemble sensors directly on the electric circuit board 40 itself. In this respect, when a reading system is positioned above the electric circuit board 40, it is also possible to assemble each sensor of the reading system (sensor for detecting the presence and absence of source document, document edge sensor or the like, for example) directly on the electric circuit board 40 itself while still taking those advantages described above. In this way, the assembling capability can be enhanced, and the numbers of the bundled wires can be reduced. The smaller boards can also be eliminated; hence contributing significantly to reducing the costs of manufacture.

Now, with reference to FIG. 11 and FIG. 12, the description will be made of another example of electric circuit board 40. In this respect, the same reference numerals are applied to the same members appearing in the description given above, and the description thereof will be omitted. Hereunder, the description will be made centering on those aspects featuring this example.

The embodiment given below is different from the embodiment shown in FIG. 9 and FIG. 10 in that the electric circuit board is not one piece, but is divided into two substantially in the central portion of the carriage traveling region. In FIG. 11, the board arranged on the left side is a main control board 25, and the one on the right side is a telephone line net control board (hereinafter referred to as a net control board) 26. This net control board 26 is provided with a control circuit for telephone line net, and telephone line. Accordingly, it is provided with an interface (modular jack) for use of the telephone line, attached telephone sets, and external telephone set. In the meantime, the control board 25 is provided with circuits other than those described above, and the bundled wires from electrical components arranged in the other locations are all connected to this control board. This control board 25 and the net control board 26 are coupled by connectors 25*a* and 26*a* which enable them to be connected a plane surface. To the assembling surface of the control board 25, there are coupled a connector 47 and the flexible cable 35 which is connected to this connector. The flexible cable 35 is arranged to pass the gap formed in the boundary between the control board 25 and net control board 26, and as shown in FIG. 12, it is connected to the carriage 18 through the hole 80*a* of the frame 80 and the cable pressure 49.

The following is the reason why the board is divided into the control board 25 and the net control board 26. In other words, the control board 25 uses many numbers of digital circuits to which comparatively low voltages applied including a driving voltage of 5 V, thus requiring no breakdown strength in the board, while the board density should be enhanced to meet an extremely high number of electrical patterns such as bus for a CPU 51 and others. Consequently, a two-layered or four-layered board is used, and comparatively expensive material is used for the board so that it can serve the purpose. In contrast, to the net control board 26, the voltage applied to the telephone line is inputted, making it necessary for the board to provide a comparatively high breakdown strength. (Here, the breakdown strength is regulated so that it can withstand lightening or the like through telephone line.) Also, the components assembled on the net control board 26 are the elements whose sizes are comparatively large (being required to deal with the analogue event and regulated breakdown strength). Therefore, it is not adequate to enhance the board density, either. Hence, using one-face board, while providing a wider gap between the patterns, it is intended to obtain the needed breakdown strength. To this end, inexpensive materials are used for the formation of the board. Also, with regard to the net control board 26, each nation has its own regulations. Therefore, it is required to produce different net control boards separately for each nation. With this in view, the arrangement is made so that at least the control board 25 can be used in common so as to save the time and labor required for designing the board as a whole in anticipation of a favorable effect obtainable by carrying out a large-scale production with a resultant reduction of costs. Further, these boards are of different systems electrically (fundamentally, these being disagreeable due to the difference in applied voltages or the like), and it is intended that lesser numbers of connecting wires are used. This is also one of the reasons why the board is divided.

Figure 11:
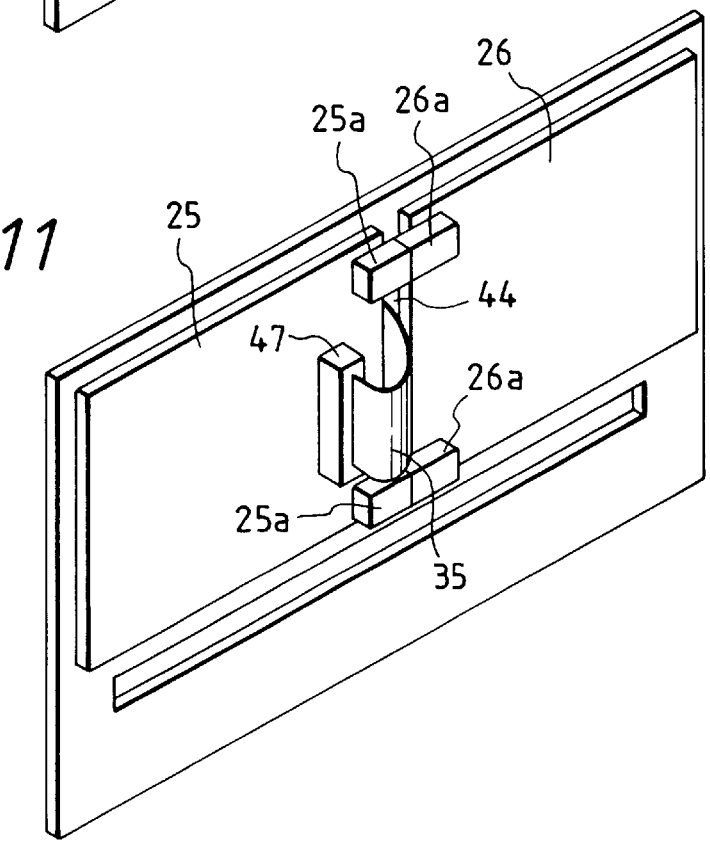
FIG. 11 is a perspective view which schematically shows an electric circuit board of a facsimile apparatus in accordance with the present embodiment.
Figure 12:
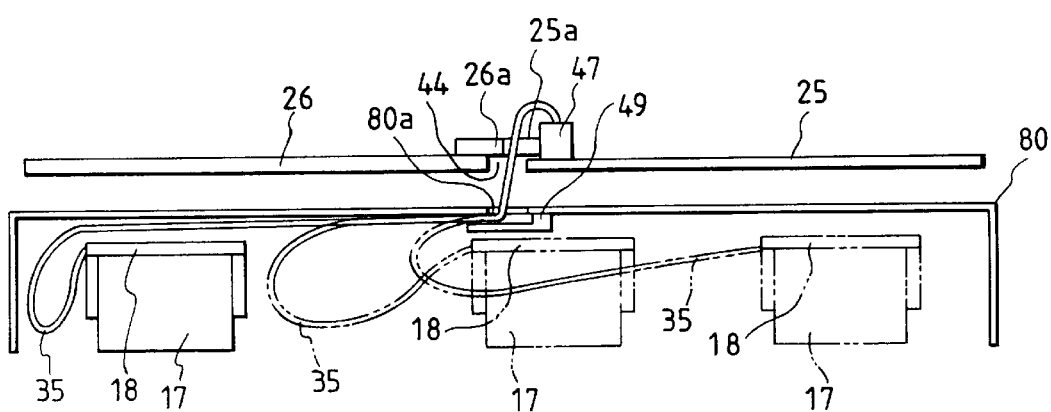
FIG. 12 is a sectionally perspective view which schematically shows an electric circuit board of a facsimile apparatus in accordance with the present embodiment.

In this respect, the net control board 26 is arranged on the right-hand side in FIG. 11. This is because the hand set attached to a usual facsimile apparatus is placed on the left-hand side (the hand set being picked up by the left hand of the user). It is, therefore, desirable to arrange the interface to meet this requirement.

(Main power-supply)

As shown in FIG. 1 and FIG. 2, the main power-supply 36 of this facsimile apparatus is arranged on the bottom of the back side of the apparatus main body. The main power-supply 36 being arranged in this position, it is easy to provide the cooling effect, which is most important for the power-supply to obtain, just by arranging a louver or the like for the cover 37 for the power-supply. Also, for the bottom cover 38 at the bottom of the apparatus where the main power-supply 36 is disposed, a rib 38*a* is provided as shielding means for preventing the ingression of ink from the head cartridge 17.

(Structure of electric circuit for the apparatus)

Figure 14:
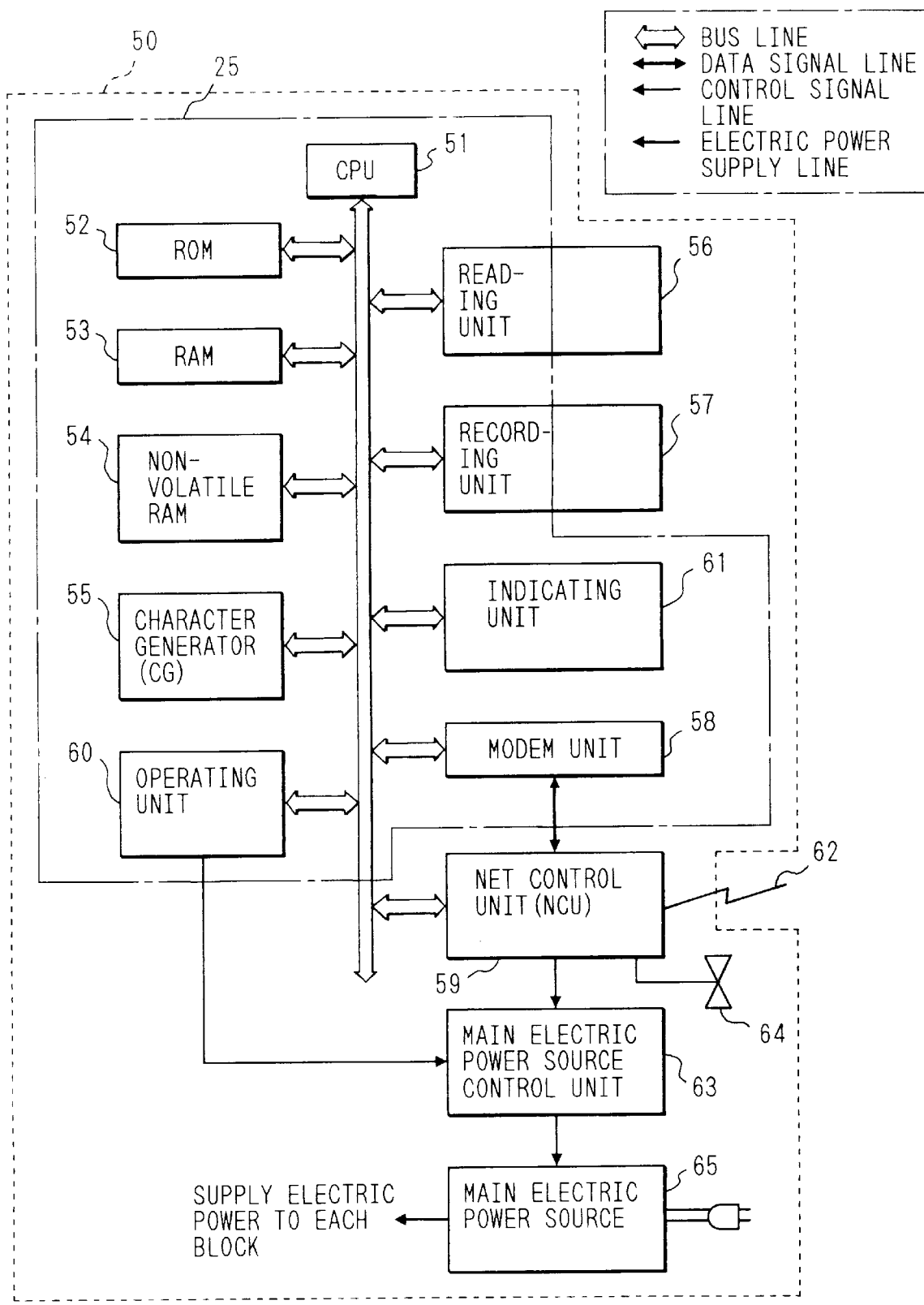
FIG. 14 is a block diagram which shows the structure of an electric circuit board of a facsimile apparatus in accordance with the present embodiment.

In conjunction with FIG. 14, the description will be made of the structure of electric circuit for the facsimile apparatus structured as described above. In FIG. 14, a reference numeral 50 designates a facsimile apparatus embodying the present invention as an apparatus for processing image information; 51, a CPU formed by a microprocessor and others, which controls a RAM 53, non-volatile RAM 54, character generator (CG) 55, reading unit 56, recording unit 57, modem unit 58, net control unit (NCU) 59, operational unit 60, and indicating unit 61 in accordance with the program which is stored in a ROM 52. Also, the RAM 53 stores binary-coded data read out by the reading system A or binary-coded data recorded by the recording system B, and stores further the binary-coded data whereby to output the modulated signals by the modem unit 58 to the telephone line 62 through the net control unit 59. Also, the RAM 53 demodulates the analogue wave signals inputted from the telephone line 63 through the net control unit 59 and the modem unit 58, and stores the binary-coded data thus demodulated.

The non-volatile RAM 54 is capable of storing the data which should be preserved (contracted dial numbers or the like, for example) reliably even when the power-supply to the facsimile apparatus 50 is turned off.

The character generator 55 is a ROM which stores characters of JIS code, ASCII code or the like, and fetches character data corresponding to the two-byte data of a specific code as required in accordance with the control of the CPU 51.

The reading unit 56 comprises a DMA controller, image processing IC, image sensor, CMOS logic IC and others, and binarizes the data read out by utilization of a contact sensor (CS) to transfer the binary-coded to the RAM 53 data one after another n accordance with the control of the CPU 51. In this respect, the setting status of source documents in the reading unit 56 can be detected by means of a mechanical sensor arranged on the way of the document feeding path. The document detection signal is transmitted to the main power-supply 63 and the CPU 51.

The recording unit 57 comprises a DMA contact, ink jet recording apparatus, CMOS logic IC, and others. Under the control of the CPU 51, this unit fetches recording data stored in the RAM 53 to record and output them as hard copies.

The modem unit 58 comprises G3 and G2 modems, a clock generator connected to them, and others. Under the control of the CPU 51, this unit modulates transmitting data stored in the RAM 53, and outputs them to the telephone line 62 through the net control unit 59. Also, the modem unit 58 induces analog signals from the telephone line 62 through the net control unit 59, and demodulates the signals into the binary-coded data for the storage in the RAM 53.

The net control unit (NCU) 59 switches over the telephone line 62 either to the modem unit 58 or to the telephone set 64 in accordance with the control of the CPU 51. Also, the net control unit 59 is provided with means for detecting call-in signals (CI). When a call-in signal is detected, this unit transmits the receiving signal to the main power-supply control unit 63 and CPU 51.

The telephone set 64 is formed integrally with the facsimile apparatus 50. More specifically, the telephone set 64 comprises a hand set and speech net work, dial, ten keys or one-touch keys, and others.

The operational unit 60 comprises a key for starting image transmission, reception, and the like, a mode selection key for designating an operational mode such as fine, standard, automatic transmission or reception, and the like at the time of sending or receiving images, ten keys or one-touch keys for use of dialing, and others. When any one of these keys is depressed, an ON-signal is inputted into the main power-supply control unit 63 and CPU 51.

The indicating unit 61 is a liquid crystal display for representing information (16-digit display for this embodiment), and indicates specific characters or the like under the control of the CPU 51.

The main power-supply control unit 63 controls the application of power (power-supply) to each unit (block) of the entire systems of the facsimile apparatus 50. This unit comprises one-chip microcomputer, secondary cell of a capacitor type, and others. The structure is arranged to make driving possible only by the power-supply from this secondary cell. The main power-supply control unit 63 transmits an actuation signal to the main-supply 65 when receiving a source document detection signal from the reading unit 56, a reception signal from the net control unit 59, or an ON signal from the operational unit 60.

The main-supply 65 is an AC input switching power source. The external control of ON and OFF of switching is possible. This power source conducts the supply of electric power or suspends it in accordance with an actuation signal or a suspension signal from the main-supply control unit 63.

In this respect, the portions of those functions described above, which are surrounded by one-dot chain lines are assembled on the control board 25 described earlier.

{Operation of the apparatus}

Figure 13:
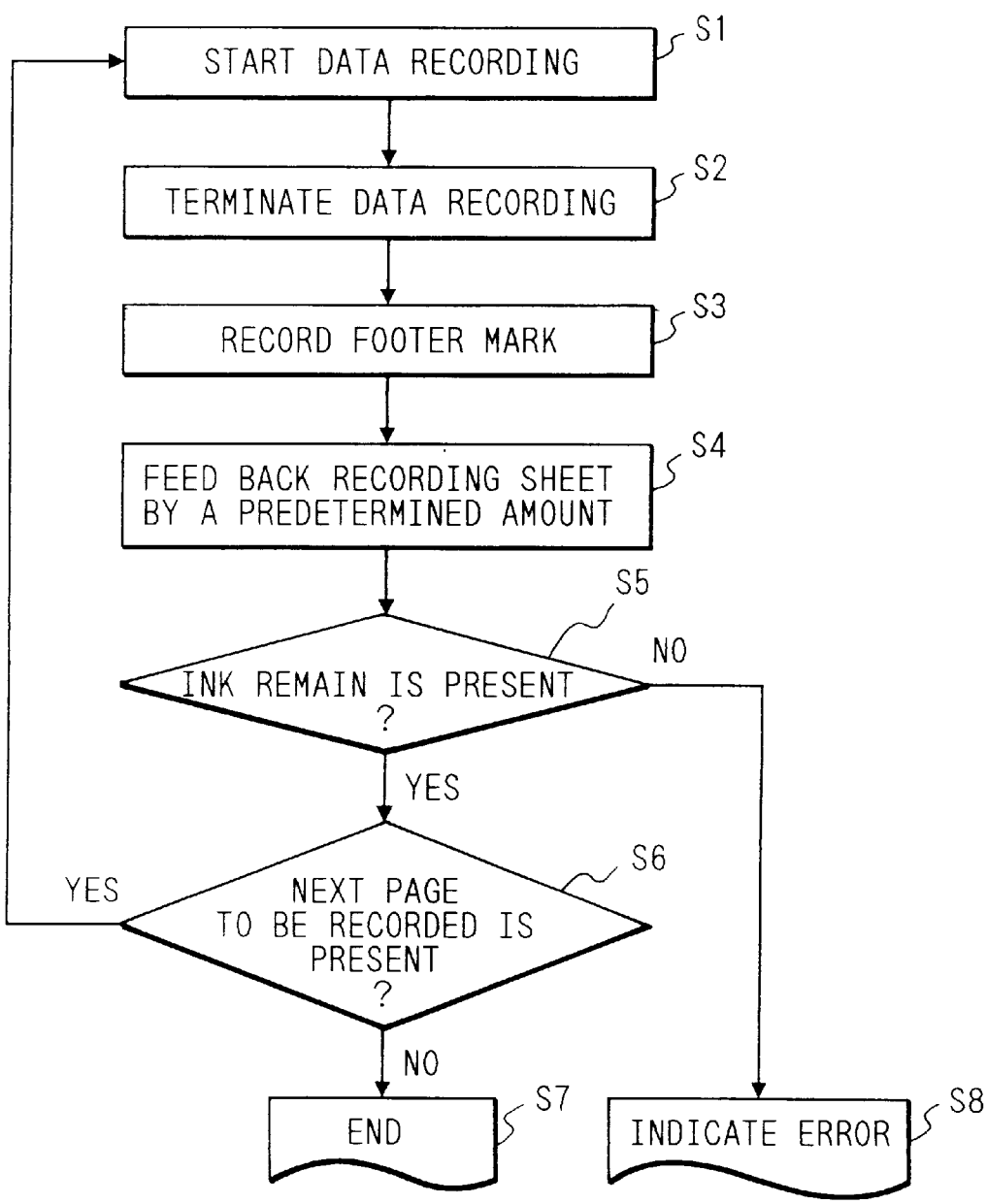
FIG. 13 is a flowchart which shows the detection of ink remains by use of a footer sensor.

Using a flowchart shown in FIG. 13 the description will be made of the fundamental operation of the facsimile apparatus structured as described above. At first, in step S1, data from the aforesaid reading system A, data from the telephone line, or data transmitted from a computer are transferred from the control system C to the recording system B. The recording system B records them on a recording sheet S accordingly. When a one-page portion is recorded (step S2), a footer mark (5×5 rectangle) is recorded in step S3 at a position which agrees with the position of the footer sensor 23 in the sheet width direction on a margin on the trailing end of the recording sheet S. After the footer mark is recorded, the sheet S is fed back for a predetermined amount in step S4 to make the positions of the footer mark and footer sensor 23 agreeable. In step S5, the status of the footer mark is detected by the footer sensor 23 to determine the presence or absence of ink in accordance with the output value of the footer sensor 23. Here, if ink is found to be present, the process will proceed to step S6. If ink is found to be absent, the process will proceed to step S8. In the step S6, it is determined whether or not there is the next page to be recorded. If affirmative, the process will return to the step Si and repeat the steps described above. If negative, the process will proceed to step S7 to terminate the recording in a normal condition. When the process proceeds to the step S8, an error message is indicated on the indicating unit of the operation system D because ink is absent, thus warning the operator accordingly.

In the embodiment described above, the reading system A is shifted to the left side when observed from the front side of the apparatus main body, and an arrangement is made so that the operational system D, the driving mechanism 10 for the reading system A, and the like are located on the right-hand side of the reading system A, but the present invention is not necessarily limited thereto. For example, it may be possible to shift the reading system A to the right side when observed from the front side of the apparatus main body, and arrange the structure so that the operational system D, the driving mechanism 10 for the reading system A, and the like are located on the left-hand side of the reading system A. In this case, the control board 25 is arranged at the same time on the left side in parallel with the net control board being arranged on the right side when observed from the front side of the apparatus main body. Further, it is preferable to arrange the interface 33 on the control board 25 side, and the modular jack 34 on the net control board 26 side.

As described above, in accordance with the aforesaid embodiment, the structure is made to arrange the control system having the control board and net control board below the source document passage plane and above the recording medium passage plane, hence reducing the numbers of boards and harnesses to make a significant improvement of costs and assembling capability. Also, it is possible to shorten the connecting distances between the reading system and control system, and the recording system and control system. Therefore, the harnesses connecting them are made shorter, and the numbers thereof are made less, hence reducing the emitting noises generated by the harnesses serving as antenna.

Also, the control board and net control board are formed integrally (more specifically, these are arranged to be substantially on the same surface at its cross-sections or made one and the same board). This arrangement brings about significant reduction of various boards and harnesses connecting them. In this way, costs can be curtailed, and the assembling capability and reliability are significantly enhanced simultaneously. Also, the connecting distances between the reading system and control system, and the recording system and control system are made shorter. Therefore, the harnesses connecting them made shorter and the numbers thereof are made less, thus reducing the emitting noises generated by the harnesses serving as antenna.

Also, the control board and net control board are formed integrally (more specifically, these are arranged to be substantially on the same surface at its cross-sections or made one and the same board), resulting in the significant reduction of various boards and harnesses connecting them. In this way, it is possible to reduce costs can be curtailed, and enhance the assembling capability and reliability significantly at the same time. Also, sensors are all assembled on the control board, attaining further enhancement of these effects.

Moreover, when observing from the front side of the apparatus main body, the reading system is shifted to one end side by utilizing the difference between the widths of the recording system and reading system. A space is made available then on the other end side of the recording system so that the operational system, the driving mechanism for the reading system and the like can be arranged on that space. In this way, it can be implemented to make the apparatus smaller. Further, it becomes possible to arrange the board for the operational system and the one for control system to be formed integrally. The numbers of boards and harnesses can be reduced to that extent, contributing to the reduction of costs and enhancement of assembling capability.

Also, when observed from the front side of the apparatus main body, the control board is arranged on the right side, and the net control board on the left side. Further, on the right-hand side of the recording medium passage plane, the modular jack is arranged to connect the hand set, secondary telephone, and telephone line to the net control board, while the interface connected to a computer is arranged on the left-hand side of the passage plane of the recording medium passage. Combined with the effects described above, this arrangement will result in the further enhancement of the assembling capability.

Also, between the recording system and the main power-supply arranged on the bottom of the apparatus, shielding means is provided, hence preventing the ingression of ink from the recording system to the main power-supply.

Further, in accordance with the embodiment described above, the electric circuit board, having a width substantially equal to the traveling region of the feeding element, is arranged in the plane including lines substantially parallel to the scanning direction of the feeding element which is provided with recording means on it. Then the flexible cable is passed through a hole formed on the electric circuit board substantially in the central portion of the traveling region of the feeding element in order to connect the feeding element and the assembling surface of the electric circuit board. Hence it is possible to make the flexible cable shorter to effectuate the reduction of the noise influence.

Also, it becomes possible to use an electric circuit board having a large area which is substantially equal to the width of the traveling region of the feeding element. Therefore, an extremely large electric circuit (main controller, modem, line net controller, telephone line, reading controller, and recording controller (including printer circuit for computer) and the like) can be installed collectively on the electric circuit board. In this way, any excessive boards can be eliminated, and bundled wires can be omitted, accordingly, thus making the provision of a smaller facsimile apparatus possible at low costs. Also, the electric circuit board described above is not arranged below recording means when adopting a recording system using ink. There is no possibility that short circuit or ignition occurs due to ink leakage. Therefore, it is unnecessary to provide a pan, shield, or the like for its prevention. It is also possible to shorten the bundled wires by arranging sensors (sensor for detecting the presence and absence of sheet, sheet edge sensor, and the like, for example) in the vicinity of recording means or assemble sensors directly on the electric circuit board. Further, when the reading system is arranged above the electric circuit board, all the sensors of the reading system (sensor for detecting the presence and absence of source document, document edge sensor, and the like, for example) can be assembled directly on the electric circuit board itself to enhance the assembling capability. Also, it is possible to reduce the numbers of bundled wires, and eliminate small boards on which the sensors are assembled, thus contributing to reducing the costs of manufacture significantly.

What is claimed is:

1. An apparatus for processing image information, said apparatus comprising:

a carriage for holding a head for processing image information for processing image information with respect to a sheet medium, said carriage being allowed to travel serially in a direction different from a feeding direction of said sheet medium;

an electric circuit board arranged in a region facing the region for said carriage to serially travel, said electric circuit board being provided with a connecting unit for connecting a conduction member in a position facing the central portion of the region for said carriage to travel serially, and in a central portion of said electric circuit board in the serially traveling direction of said carriage, for obtaining an electrical conduction with said head for processing image information held on said carriage.

2. An apparatus for processing image information according to claim 1, wherein said head for processing image information is a recording head for forming ink images on said sheet medium.

3. An apparatus for processing image information according to claim 1, wherein said head for processing image information is an ink jet recording head for forming ink images on said sheet medium by discharging ink droplets onto said sheet medium.

4. An apparatus for processing image information according to claim 1, wherein said head for processing image information is a reading unit for reading the image information formed on said sheet medium.

5. An apparatus for processing image information according to claim wherein said conduction member is a flexible cable.

6. An apparatus for processing image information provided with a control system for controlling the operation of said apparatus, comprising:

a reading system for transferring to said control system the information read by feeding a source document; and a recording system positioned below said reading system for recording on a recording medium the information transferred from said control system;

a carriage for holding the recording head for processing image information with respect to a sheet medium, said carriage being allowed to travel serially in a direction different from a feeding direction of said sheet medium;

an electric circuit board of the control system arranged in a region facing the region for said carriage to serially travel, said electric circuit board being provided with a connecting unit for connecting conductive member in a position facing the central portion of the region for said carriage to travel serially, and in a central portion of said electric-circuit board in the serially traveling direction of said carriage, for obtaining an electrical conduction with said head for processing image information held on said carriage.

7. An apparatus for processing image information according to claim 6, wherein the control board and net control board of said control system are integrally formed.

8. An apparatus for processing image information according to claim 6, wherein a sensor for detecting the presence and absence of a source document, a sensor for detecting the status of a rotational element for feeding a recording medium, a sensor for detecting edges of a recording medium; and a sensor for recording a pattern on a recording medium for determining ink remains and the presence of jamming, and said sensors are assembled on the control board of said control system.

9. An apparatus for processing image information according to claim 6, wherein an operational system is arranged with an operating board having various key switches and an indicating unit on one end of the reading system when observed from the front side of the apparatus main body.

10. An apparatus for processing image information according to claim 9, wherein the operating board of the operational system, and the control board and net control board of the control system are integrally formed.

11. An apparatus for processing image information according to claim 6, wherein a driving mechanism is arranged on one side of the reading system, when observed from the front side of the apparatus main body, for driving source document feeding means of said reading system.

12. An apparatus for processing image information according to claim 6, wherein said control board is arranged on one end with said net control board on the other end in parallel when observed from the front side of the apparatus main body.

13. An apparatus for processing image information according to claim 12, wherein an interface is arranged on said control board side outside the passage region of a recording medium, with a modular jack on said net control board side outside the passage region of said recording medium when observed from the front side of the apparatus main body.

14. An apparatus for processing image information according to claim 6, wherein a shielding means is provided between the recording system and the main power-supply arranged on the bottom of the apparatus.

15. An apparatus for processing image information according to claim 6, wherein the recording system is provided with electrothermal transducing elements for generating thermal energy for use of ink discharge.

16. An apparatus for processing image information according to claim 6, wherein the recording system is an ink jet recording type for recording by discharging ink in accordance with signals.

17. An apparatus for processing image information comprising:

reading means for reading a source document;

recording means for recording images on a sheet;

a feeding element having recording means mounted thereon for scanning ins said main scanning direction; and electric circuit board connected to said feeding element by a flexible cable for controlling an entire systems of said apparatus including recording means, said electric circuit board being arranged in a plane including lines substantially parallel to said scanning direction of said feeding element, and provided with a width substantially equal to the traveling range of said feeding element, wherein the assembling surface of said electric circuit board is made a face opposite to said feeding element, and said flexible cable is allowed to pass a hole arranged substantially in a central portion of the traveling range of said feeding element for connecting said feeding element and said electric circuit board.

18. An apparatus for processing image information comprising:

reading means for-reading a source document;

recording means for recording images on a sheet;

a feeding element having recording means mounted thereon for scanning in said main scanning direction; and an electric circuit board connected to said feeding element by a flexible cable for controlling an entire system of said apparatus including recording means, said electric circuit board being arranged in a plane including lines substantially parallel to said scanning direction of said feeding element, and provided with a width substantially equal to a traveling range of said feeding element, wherein an assembling surface of said electric circuit board is made on a face opposite to said feeding element, and said electric circuit board is provided with a plurality of boards connected together by wires, one of a boundaries of which is positioned substantially in a central portion of the traveling range of said feeding element, and said flexible cable is allowed to pass through a space created in said boundary for connecting said feeding element and the assembling surface of said electric circuit board.

19. An apparatus for processing image information according to claim 18, wherein said electric circuit board is formed by two pieces, one of which is a board for controlling a telephone line net, and the other, the electric circuit board therefor.

20. An apparatus for processing image information according to claim 18, wherein said electric circuit board is supported substantially at right angles, above the sheet feeding plane, and below the feeding plane of said source document.

21. An apparatus for processing image information according to claim 18, wherein said recording means is an ink jet recording type for recording by discharging ink in response to signals in accordance with image information.

22. An apparatus for processing image information according to claim 21, wherein said recording means is provided with electrothermal transducing elements for generating thermal energy for use of ink discharge.

* * * * *

UNITED STATES PATENT AND TRADEMARK OFFICE
CERTIFICATE OF CORRECTION

PATENT NO.    : 6,113,207
DATED         : September 5, 2000
INVENTOR(S)   : YUJI NAKANO, ET AL.

It is certified that error appears in the above-identified patent and that said Letters Patent is hereby corrected as shown below:

ON THE TITLE PAGE:

Insert: --[*] Notice: This patent issued on a continued prosecution application filed under 37 CFR 1.53(d), and is subject to the twenty year patent term provisions of 35 U.S.C. 154(a)(2).--; and

[57] ABSTRACT

Line 17, "arrange" should read --arranged--.

COLUMN 2:

Line 9,  "around" should be deleted;
Line 22, "as used" should read --as is used--;
Line 32, "as used" should read --as is used--;
Line 49, "a" should read --an--; and
Line 52, "The" should read --the--.

COLUMN 3:

Line 18, "to make" should read --making--;
Line 32, "while" should read --and--;
Line 53, "board" should read --board, which is a--;
Line 54, "pickup" should read --pick up--; and
Line 65, "pickup" should read --pick up--.

UNITED STATES PATENT AND TRADEMARK OFFICE
CERTIFICATE OF CORRECTION

PATENT NO.    : 6,113,207
DATED         : September 5, 2000
INVENTOR(S)   : YUJI NAKANO, ET AL.

It is certified that error appears in the above-identified patent and that said Letters Patent is hereby corrected as shown below:

COLUMN 4:

Line 23, "board arranged" should read --board is arranged--;
    Line 24, "is" should be deleted;
    Line 32, "in" should be deleted; and
    Line 47, "as" should read --as is--.

COLUMN 5:

Line 26, "for processing image information" should be deleted.

COLUMN 6:

Line 21, "systems" should read --system--; and
    Line 40, "systems" should read --system--.

COLUMN 7:

Line 6, "a" should read --an--.

COLUMN 8:

Line 2, "tens" should read --magnitudes--;
    Line 25, "sour ce" should read --source--;
    Line 31, "height-hand" should read --right-hand--;
    Line 36, "motor ana" should read --motor 10a--;
    Line 37, "g ears 50e" should read --gears 10e--;
    Line 38, "loa" should read --10a--;

COLUMN 8 (cont.)

UNITED STATES PATENT AND TRADEMARK OFFICE
CERTIFICATE OF CORRECTION

PATENT NO. : 6,113,207

DATED : September 5, 2000

INVENTOR(S) : YUJI NAKANO, ET AL.                     Page 3 of 6

It is certified that error appears in the above-identified patent and that said Letters Patent is hereby corrected as shown below:

COLUMN 8: (cont.)

Line 40, "th e" should read --the--;
    Line 42, "a nd" should read --and--;
    Line 47, "degrees" should read --degree--; and
    Line 57, "are" should read --is--.

COLUMN 9:

Line 5, "and reciprocates" should read --and which reciprocates--;
    Line 6, "rectangular" should read --perpendicular--;
    Line 34, "as laser," should read --as a laser,--; and
    Line 54, "positions" should read --position--.

COLUMN 10:

Line 3, "in" should be deleted;
    Line 8, "other" should read --another--;
    Line 29, "board 26 on" should read --board 26 is on--; and
    Line 54, "patten" should read --pattern--.

COLUMN 11:

Line 9, "remains" should read --remaining--;
    Line 14, "case" should read --care--;
    Line 17, "these" should read --this--; and
    Line 58, "purport" should read --purpose--.

UNITED STATES PATENT AND TRADEMARK OFFICE
CERTIFICATE OF CORRECTION

PATENT NO.   : 6,113,207
DATED        : September 5, 2000
INVENTOR(S)  : YUJI NAKANO, ET AL.

It is certified that error appears in the above-identified patent and that said Letters Patent is hereby corrected as shown below:

COLUMN 12:

Line 7,  "purport" should read --purpose--; and
    Line 43, "pass it." should read --pass through it.--.

COLUMN 13:

Line 6,  "flame 80" should read --frame 80--;
    Line 21, "any longer" should be deleted;
    Line 30, "cartridge 18" should read --cartridge 17--;
    Line 38, "numbers" should read --number--; and
    Line 66, "connected" should read --connected on--.

COLUMN 14:

Line 2,  "pass" should read --pass through--;
    Line 10, "voltages applied" should read --voltages are applied--;
    Line 21, "lightening" should read --lightning--;
    Line 40, "disagreeable" should read --unacceptable--; and
    Line 60, "ingression" should read --ingress--.

COLUMN 15:

Line 4,  "operational" should read --operating--;
    Line 13, "line 63" should read --line 62--;
    Line 28, "binary-coded" should read --binary-coded data--;
    Line 29, "n" should read --in--;
    Line 34, "power-supply 63" should read --power-supply control unit 63-;

UNITED STATES PATENT AND TRADEMARK OFFICE
CERTIFICATE OF CORRECTION

PATENT NO. : 6,113,207

DATED : September 5, 2000

INVENTOR(S) : YUJI NAKANO, ET AL.

It is certified that error appears in the above-identified patent and that said Letters Patent is hereby corrected as shown below:

COLUMN 15:

Line 56, "net work," should read --network,--; and
    Line 58, "operational" should read --operating--.

COLUMN 16:

Line 5, "systems" should read --system--;
    Line 10, "main-supply 65" should read --main electric power source 65--;
    Line 13, "operational" should read --operating--;
    Line 14, "main-supply 65" should read --main electric power source 65--;
    Line 37, "agreeable." should read --agree.--; and
    Line 45, "Si" should read --S1--.

COLUMN 17:

Line 24, "them" should read --them are--;
    Line 32, "can be curtailed," should be deleted; and
    Line 61, "ingression" should read --ingress--.

COLUMN 18:

Line 66, "claim" should read --claim 1,--.

COLUMN 19:

Line 16, "conductive" should read --a conductive--.

UNITED STATES PATENT AND TRADEMARK OFFICE
CERTIFICATE OF CORRECTION

PATENT NO. : 6,113,207
DATED : September 5, 2000
INVENTOR(S) : YUJI NAKANO, ET AL.

It is certified that error appears in the above-identified patent and that said Letters Patent is hereby corrected as shown below:

COLUMN 20:

Line 8, "ins" should read --in--;
Line 11, "electric" should read --an electric--;
Line 12, "systems" should read --system--; and
Line 26, "for-reading" should read --for reading--.

Signed and Sealed this

Eighth Day of May, 2001

Attest:

NICHOLAS P. GODICI

Attesting Officer

Acting Director of the United States Patent and Trademark Office